(12) United States Patent
Hwang et al.

(10) Patent No.: US 7,190,510 B2
(45) Date of Patent: Mar. 13, 2007

(54) METRO WAVELENGTH DIVISION MULTIPLEXING NETWORK

(75) Inventors: Seong-Taek Hwang, Pyeongtaek-si (KR); Gyu-Woong Lee, Suwon-si (KR); Chang-Sup Shim, Seoul (KR); Yun-Je Oh, Yongin-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 0 days.

(21) Appl. No.: 10/869,775

(22) Filed: Jun. 16, 2004

(65) Prior Publication Data

US 2005/0162732 A1 Jul. 28, 2005

(30) Foreign Application Priority Data

Jan. 28, 2004 (KR) ............... 10-2004-0005514

(51) Int. Cl.
*H01S 4/00* (2006.01)
*H01S 5/00* (2006.01)
*H04B 10/12* (2006.01)

(52) U.S. Cl. ................... 359/334; 359/337.4
(58) Field of Classification Search ........ 359/334, 359/337.4
See application file for complete search history.

(56) References Cited

U.S. PATENT DOCUMENTS

| 6,215,581 B1* | 4/2001 | Yadlowsky .......... 359/337 |
| 6,760,150 B2* | 7/2004 | Goto et al. ......... 359/337.12 |
| 2002/0044324 A1* | 4/2002 | Hoshida et al. ........ 359/179 |
| 2002/0060839 A1* | 5/2002 | Oh et al. ........... 359/337.5 |
| 2003/0035202 A1* | 2/2003 | Islam et al. .......... 359/334 |
| 2003/0090779 A1* | 5/2003 | Lee ................ 359/334 |

* cited by examiner

*Primary Examiner*—Jack Keith
*Assistant Examiner*—Eric Bolda
(74) *Attorney, Agent, or Firm*—Cha & Reiter, LLC

(57) ABSTRACT

A metro wavelength division multiplexing network is disclosed and includes a plurality of optical repeaters connected to each other through an optical fiber link, wherein each of the optical repeaters includes a Raman gain medium for Raman-amplifying inputted optical signals, an amplification medium having a center wavelength different from a gain center wavelength of the Raman gain medium and amplifying a Raman-amplified optical signals, and a pumping unit for pumping the Raman gain medium.

8 Claims, 4 Drawing Sheets

METRO WAVELENGTH DIVISION MULTIPLEXING NETWORK

CLAIM OF PRIORITY

This application claims priority to an application entitled "Metro wavelength division multiplexing network," filed in the Korean Intellectual Property Office on Jan. 28, 2004 and assigned Ser. No. 2004-5514, the contents of which are hereby incorporated by reference.

BACKGROUND OF THE INVENTION

1. Field of the Invention

The present invention relates to an optical communication network, and more particularly to a metro wavelength division multiplexing network.

2. Description of the Related Art

An erbium doped fiber amplifier (EDFA) and a Raman amplifier are typically used for amplifying attenuated optical signals in the transmission of mass storage data in a metro optical communication network. Gain flat bands of optical amplifiers must be widen in order to employ a great number of channels during transmission. Therefore, the EDFA usually employs a gain flattening filter so as to obtain flattened gains. Also, the Raman amplifier flattens gains by coupling a plurality of pump lights of mutually differing wavelengths in order to obtain flattened gains.

As the peak of a Raman gain occurs at a long wavelength shifted from a wavelength of a pump light by about 13 THz, it is possible to select desired amplification bands according to a center wavelength of the pump light and adjust gain-flatness of an optical amplifier using a plurality of pump wavelengths. However, since the Raman amplifier generally has inferior amplification efficiency, the Raman amplifier must employ pump light sources having great power in order to output high power. Thus, the implementation of Raman amplifier is expensive.

Although there are various disadvantages, erbium doped fiber amplifiers (EDFAs) have been recently replaced with semiconductor optical amplifiers (SOAs) to be used as the semiconductor optical amplifiers. The SOA has low power and a high noise figure. Nevertheless, since the SOA can be fabricated through mass-production in a compact size, the SOA has been represented as an economical optical amplifier. Moreover, the SOA can be used in a metro wavelength division multiplexing network because the metro wavelength division multiplexing network does not require a long distance between optical repeaters, so it is not necessary for the optical amplifier to have a high-level output property.

Currently, there have been many efforts of using the SOA together with the Raman amplifier in order to compensate for the disadvantages associated with the SOA. Although the Raman amplifier has low output power, the Raman amplifier has a superior noise figure, so it is possible to overcome disadvantages of the SOA if the Raman amplifier can be used in a novel way with the SOA.

FIG. 1 is a view showing a structure of a conventional metro wavelength division multiplexing network. The network 100 includes first to third optical repeaters (ORs) 112, 114, and 116 connected to each other through an optical fiber link 160. The first to the third optical repeaters 112, 114, and 116 include Raman gain mediums (RGMs) 122, 124, and 126, a plurality of pump light sources (LSs) 131 to 139, optical couplers (CPs) 142, 144, and 146, and semiconductor optical amplifiers (SOAs) 152, 154, and 156.

The first optical repeater 112 includes the first Raman gain medium 122, the first to the third LSs 131 to 133, the first CP 142, and the first SOA 152. The second optical repeater 114 includes the second Raman gain medium 124, the fourth to the sixth LSs 134 to 136, the second CP 144, and the second SOA 154. The third optical repeater 116 includes the third Raman gain medium 126, the seventh to the ninth LSs 137 to 139, the third CP 146, and the third SOA 156. Hereinafter, the description will be made only with reference to the first optical repeater 112 because the first to the third optical repeaters have the same structures with each other.

In operation, the first to the third LSs 131 to 133 output pump lights having first to third wavelengths ($\lambda_1$ to $\lambda_3$), and the first CP 142 outputs the inputted pump lights ($\lambda_1$ to $\lambda_3$) to the first RGM 122. The first RGM 122 is pumped by the pump lights ($\lambda_1$ to $\lambda_3$) and also amplifies inputted optical signals so as to output the amplified optical signals. The amplified optical signals are inputted to the first SOA 152 through the first CP 142. The SOA 152 re-amplifies the inputted optical signals so as to output the re-amplified optical signals to the optical fiber link 160.

In a long distance communication, a cost of an optical communication network is less important than a reliability thereof. In contrast, in a subscriber regional network or a metro regional network, a cost of the optical communication network becomes a more important factor. However, in the conventional metro wavelength division multiplexing network, it is necessary to have a flattened gain characteristic in order to amplify optical signals having multi-channels. To this end, optical repeaters may include a plurality of pump light sources. For these reasons, manufacturing costs of the optical repeaters may increase.

SUMMARY OF THE INVENTION

Accordingly, the present invention has been made to solve the above-mentioned problems occurring in the prior art and provides additional advantages, by providing a metro wavelength division multiplexing network which includes optical repeaters having Raman gain mediums and semiconductor optical amplifiers and capable of reducing manufacturing costs.

In one aspect of the invention, there is provided a metro wavelength division multiplexing network comprising: a plurality of optical repeaters connected to each other through an optical fiber link, wherein each of the optical repeaters includes a Raman gain medium for Raman-amplifying inputted optical signals, an amplification medium having a center wavelength different from a gain center wavelength of the Raman gain medium and amplifying a Raman-amplified optical signals, and a pumping unit for pumping the Raman gain medium.

Still another aspect is that the present invention may be realized in a simple, reliable, and inexpensive implementation.

BRIEF DESCRIPTION OF THE DRAWINGS

The above, features and advantages of the present invention will be more apparent from the following detailed description taken in conjunction with the accompanying drawings, in which.

DETAILED DESCRIPTION

Hereinafter, embodiments of the present invention will be described in detail with reference to the accompanying drawings. For the purposes of clarity and simplicity, a detailed description of known functions and configurations incorporated herein will be omitted as it may make the subject matter of the present invention unclear.

Figure 1:
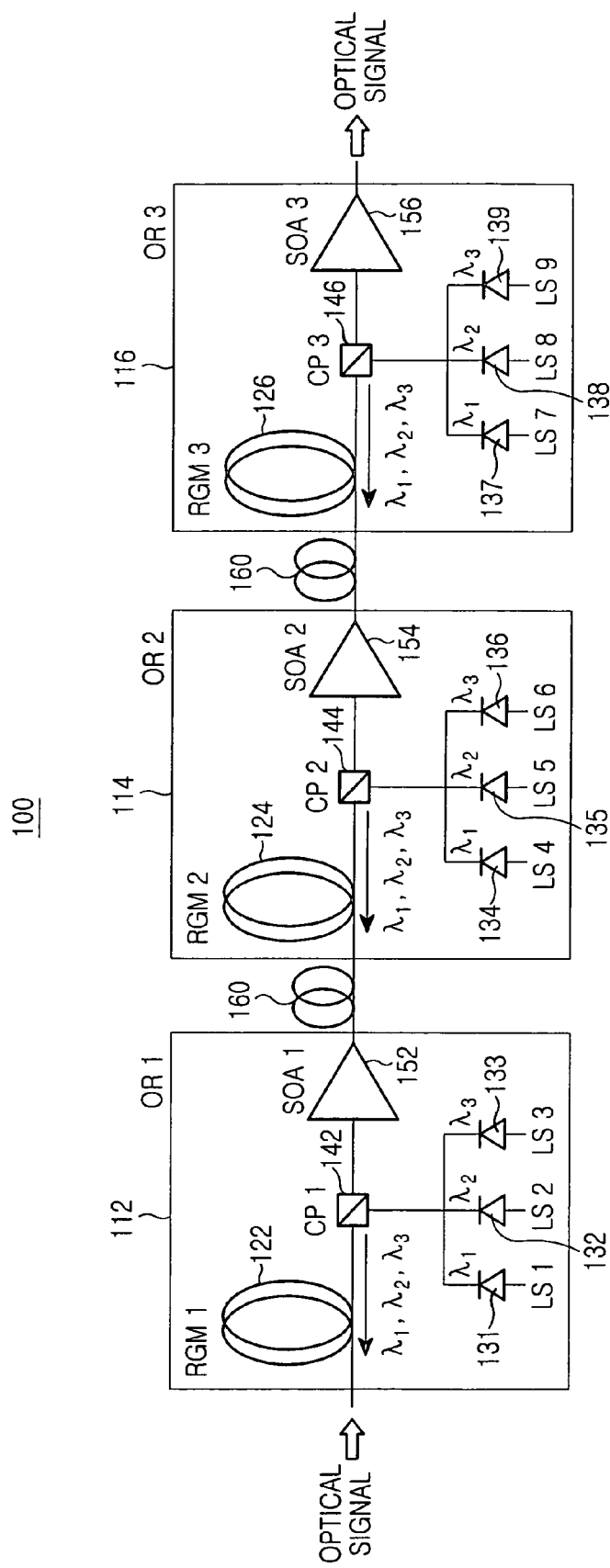
FIG. 1 is a view showing a structure of a conventional metro wavelength division multiplexing network.
Figure 2:
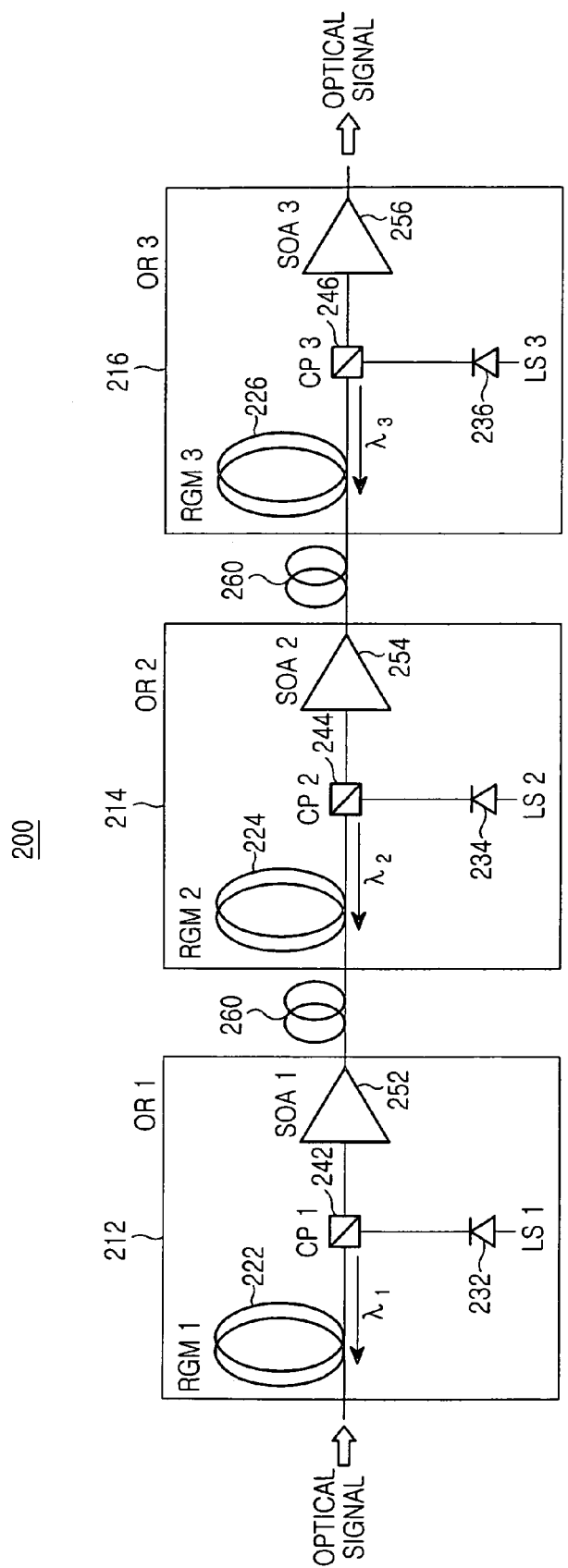
FIG. 2 is a view showing a structure of a metro wavelength division multiplexing network according to a first embodiment of the present invention.

FIG. 2 is a view showing a structure of a metro wavelength division multiplexing network 200 according to a first embodiment of the present invention. As shown, the network 200 includes first to third optical repeaters 212, 214, and 216 connected to each other through an optical fiber link 260. The first to the third optical repeaters 212, 214, and 216 include Raman gain mediums 222, 224, and 226, optical couplers 242, 244, and 246, pump light sources 232, 234, and 236, and semiconductor optical amplifiers 252, 254, and 256.

The first optical repeater 212 includes the first Raman gain medium 222, the first pump light source 232, the first optical coupler 242, and the first semiconductor optical amplifier 252. The second optical repeater 214 includes the second Raman gain medium 224, the second pump light source 234, the second optical coupler 244, and the second semiconductor optical amplifier 254. The third optical repeater 216 includes the third Raman gain medium 226, the third pump light source 236, the third optical coupler 246, and the third semiconductor optical amplifier 256. A single mode fiber (SMF), a non-zero dispersion shift fiber (NZDSF), or a dispersion compensation fiber (DCF) can be used as the first to the third Raman gain mediums 222, 224, and 226. Also, a laser diode can be used as the first to the third pump light sources 232, 234, and 236. In addition, a WDM coupler such as an arrayed waveguide grating (AWG) can be used as the first to the third optical couplers 242, 244, and 246. Furthermore, a typical semiconductor optical amplifier or a gain clamped SOA (GCSOA) can be used as the first to the third semiconductor optical amplifiers 252, 254, and 256.

Although a limited number of repeaters is shown in FIG. 2 for illustrative purposes, it is to be understood that the teachings of the present invention can be applied to a network having a much larger number of repeaters. Thus, the number of repeaters in the drawing should not impose limitations on the scope of the invention.

In operation, the first pump light source 232 outputs a pump light having a first wavelength ($\lambda_1$) (hereinafter, referred to as "a first pump light"), and the first pump light ($\lambda_1$) is outputted to the first Raman gain medium 222 by the first optical coupler 242. The first Raman gain medium 222 is pumped by the first pump light ($\lambda_1$) and amplifies inputted optical signals so as to output the amplified optical signals. The firstly-amplified optical signals are inputted to the first semiconductor optical amplifier 252 through the first optical coupler 242, and the first semiconductor optical amplifier 252 re-amplifies the inputted optical signals so as to output the re-amplified optical signals to the optical fiber link 260.

The second pump light source 234 outputs a pump light having a second wavelength ($\lambda_2$) (hereinafter, referred to as "a second pump light"), the second pump light ($\lambda_2$) is outputted to the second Raman gain medium 224 by the second optical coupler 244. The second Raman gain medium 224 is pumped by the second pump light ($\lambda_2$) and amplifies optical signals inputted from the optical fiber link 260 so as to output the amplified optical signals. The amplified optical signals are inputted to the second semiconductor optical amplifier 254 through the second optical coupler 244, and the second semiconductor optical amplifier 254 re-amplifies the inputted optical signals so as to output the re-amplified optical signals to the optical fiber link 260.

The third pump light source 236 outputs a pump light having a third wavelength ($\lambda_3$) (hereinafter, referred to as "a third pump light"), the third pump light ($\lambda_3$) is outputted to the third Raman gain medium 226 by the third optical coupler 246. The third Raman gain medium 226 is pumped by the third pump light ($\lambda_3$) and amplifies optical signals inputted from the optical fiber link 260 so as to output the amplified optical signals. The amplified optical signals are inputted to the third semiconductor optical amplifier 256 through the third optical coupler 246, and the third semiconductor optical amplifier 256 re-amplifies the inputted optical signals so as to output the re-amplified optical signals to the optical fiber link 260.

The optical signals have a plurality of channels and a predetermined wavelength band. Wavelengths of the first to the third pump lights ($\lambda_1$ to $\lambda_3$) are set in such a manner that a whole gain curve of the first to the third Raman gain mediums 222, 224, and 226 is flattened with respect to the predetermined wavelength band. Since gain center wavelengths, which are Raman gain peaks of the Raman gain mediums 222, 224, and 226, occur at long wavelengths shifted from wavelengths of corresponding pump lights ($\lambda_1$ to $\lambda_3$) by about 13 THz, the gains of channels corresponding to the gain center wavelengths from among wavelengths of optical signals amplified in the Raman gain mediums 222, 224, and 226 are higher than those of other channels. However, since optical signals are amplified by the adjacent semiconductor optical amplifiers 252, 254, and 256, gain difference between channels is reduced.

Since the whole gain curve of the first to the third Raman gain mediums 222, 224, and 226 is flattened with respect to a wavelength band of the optical signals, OSNR (optical signal to noise ratio) between channels of optical signals outputted from the network 200 is constantly maintained.

In particular, the first to the third optical repeaters 212, 214, and 216 can generate various gain center wavelengths of optical signals amplified by the first to the third Raman gain mediums 222, 224, and 226 and the first to the third semiconductor optical amplifiers 252, 254, and 256 as follows.

First, the first to the third Raman gain mediums 222, 224, and 226 are pumped by first to third pump lights having a wavelength of 1430 nm and amplify optical signals having a gain center wavelength of 1530 nm shifted from the wavelength of the pump lights by about 13 THz (100 nm). In this case, the first to the third optical repeaters 212, 214, and 216 include the first to the third semiconductor optical amplifiers 252, 254, and 256 capable of amplifying an optical signal having a gain center wavelength of 1550 nm, thereby amplifying optical signals having a wide wavelength band in such a manner that the optical signals having the wide wavelength band have high gains.

Secondly, the first to the third optical repeaters 212, 214, and 216 include the first to the third Raman gain mediums 222, 224, and 226, which are pumped by the first to third pump light having a wavelength of 1450 nm, for amplifying optical signals having a gain center wavelength of 1550 nm and the first to the third semiconductor optical amplifiers 252, 254, and 256 for amplifying optical signals having a gain center wavelength of 1530 nm.

Thirdly, the network 200 can employ optical repeaters 212, 214, and 216, which include Raman gain mediums 222, 224, and 226 for amplifying optical signals having a gain center wavelength of 1550 nm and semiconductor optical amplifiers 252, 254, and 256 for amplifying optical signals having a gain center wavelength of 1530 nm, and optical repeaters 212, 214, and 216, which include Raman gain mediums 222, 224, and 226 for amplifying optical signals having a gain center wavelength of 1530 nm and semiconductor optical amplifiers 252, 254, and 256 for amplifying optical signals having a gain center wavelength of 1550 nm.

Figure 3:
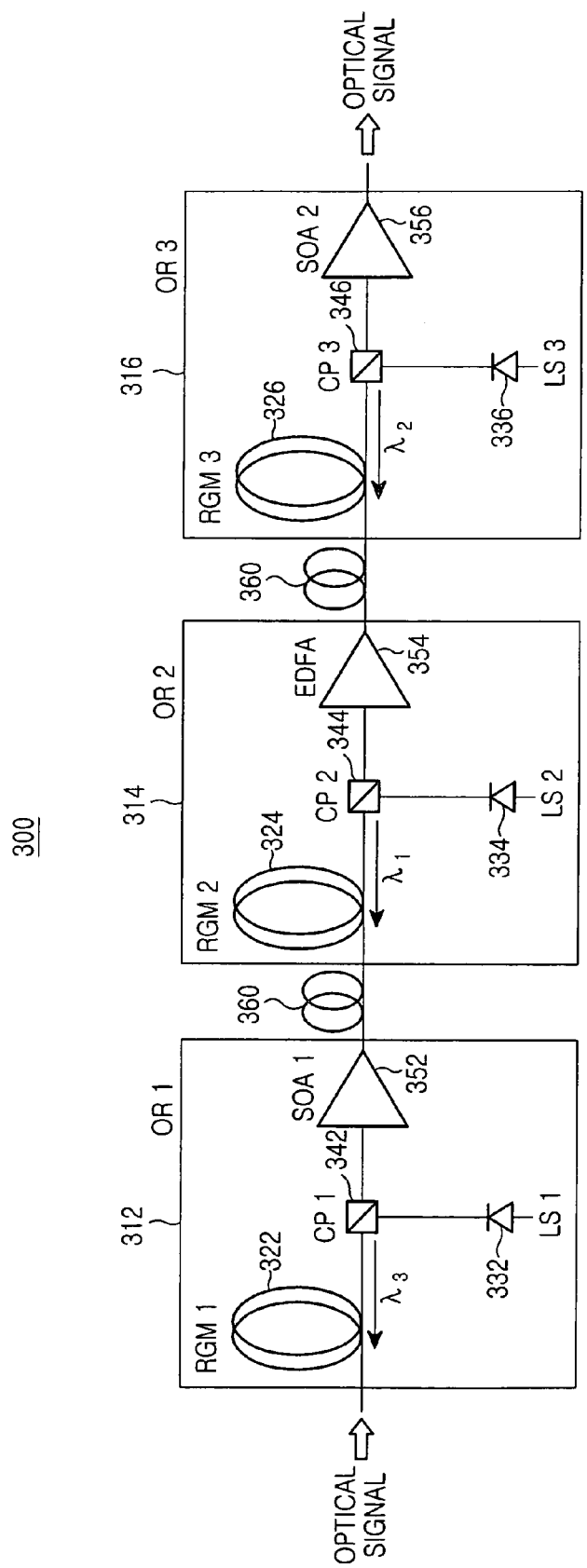
FIG. 3 is a view showing a structure of a metro wavelength division multiplexing network according to a second embodiment of the present invention.

FIG. 3 is a view showing a structure of a metro wavelength division multiplexing network 300 according to a second embodiment of the present invention. Referring to FIG. 3, the structure of the metro wavelength division multiplexing network 300 is the same as the structure of the network 200 shown in FIG. 2. Redundant description will be omitted below for simplicity.

The network 300 includes first to third optical repeaters 312, 314, and 316 having the same structure. The optical repeaters 312, 314, and 316 include Raman gain mediums 322, 324, and 326, optical couplers 342, 344, and 346, pump light sources 332, 334, and 336, and amplification mediums 352, 354, and 356.

The first optical repeater 312 includes the first Raman medium 312, the first pump light source 332, the first optical coupler 342, and the first semiconductor 352. The second optical repeater 314 includes the second Raman medium 324, the second pump light source 334, the second optical coupler 344, and the gain flattened erbium doped fiber amplifier 354. The third optical repeater 316 includes the third Raman medium 326, the third pump light source 336, the third optical coupler 346, and the third semiconductor optical amplifier 356.

Figure 4:
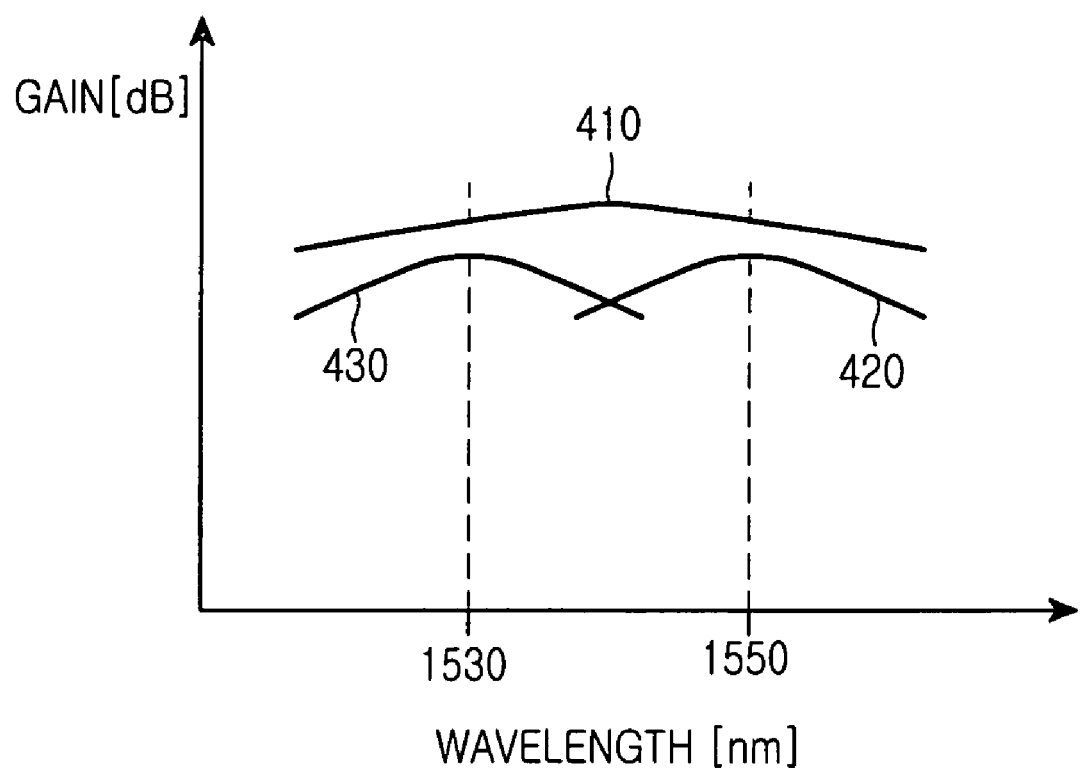
FIG. 4 is a graph showing a gain characteristic of amplified optical signals in an optical repeater shown in FIG. 2.

FIG. 4 is a graph showing a gain characteristic of amplified optical signals in the optical repeater shown in FIG. 2. Referring to FIGS. 2 and 4, when the Raman gain mediums 222, 224, and 226 and the semiconductor optical amplifiers 252, 254, and 256 forming first to the third optical repeaters 212, 214, and 216 are realized such that they have mutually differing gain center wavelengths, optical signals having low gains from among optical signals, which are firstly amplified by the Raman gain mediums 212, 214, and 216, are secondly amplified by the semiconductor optical amplifiers 252, 254, and 256, thereby reducing a gain difference between channels providing the optical signals.

For instance, if a center wavelength of optical signals amplified by the Raman gain mediums 222, 224, and 226 is 1530 nm 430, a center wavelength of optical signals amplified by the semiconductor optical amplifiers 252, 254, and 256 is set as 1550 nm 420. Accordingly, optical signals amplified by the semiconductor optical amplifiers 252, 254, and 256 and the Raman gain mediums 222, 224, and 226 are overlapped with each other, so that it is possible to generate optical signals 410 having high gains in a wide wavelength band.

As described above, the metro wavelength division multiplexing network according to the present invention includes a plurality of optical repeaters, and the optical repeaters include Raman gain mediums and semiconductor optical amplifiers having different gain center wavelengths, so that the number of Raman pump light sources used for pumping the Raman gain mediums can be reduced and combination semiconductor optical amplifiers with Raman pump light sources is easily achieved.

In addition, the metro wavelength division multiplexing network according to the present invention can obtain optical signals having a constant gain of a wide wavelength band, so that the number of available transmission channels may increase as compared with other networks having the same structure.

While the invention has been shown and described with reference to certain preferred embodiments thereof, it will be understood by those skilled in the art that various changes in form and details may be made therein without departing from the spirit and scope of the invention. Consequently, the scope of the invention should not be limited to the embodiments, but should be defined by the appended claims and equivalents thereof.

What is claimed is:

1. A metro wavelength division multiplexing network comprising:
    a plurality of optical repeaters coupled to each other through an optical fiber link, wherein gain center wavelengths between optical repeaters are different from one another and includes:
    a Raman gain medium disposed in each of the optical repeater for Raman-amplifying inputted optical signals;
    an amplification medium having a center wavelength different from a gain center wavelength of the Raman gain medium and amplifying a Raman-amplified optical signals, wherein the amplification medium includes a gain clamped semiconductor optical amplifier; and
    a pumping unit for pumping the Raman gain medium,
    wherein the Raman gain medium and amplification medium are configured so wavelength band of optical signals amplified by the Raman gain medium and the amplification medium overlap with each other.

2. The metro wavelength division multiplexing network as claimed in claim 1, wherein the Raman gain medium includes at least one selected from the group consisting of a single mode fiber, a non-zero dispersion shift fiber, and a dispersion compensation fiber.

3. The metro wavelength division multiplexing network as claimed in claim 1, wherein the amplification medium includes a gain flattened erbium doped fiber amplifier.

4. The metro wavelength division multiplexing network as claimed in claim 1, wherein the amplification medium includes a semiconductor optical amplifier.

5. The metro wavelength division multiplexing network as claimed in claim 1, further comprising a coupler for providing the output of the pumping unit to the Raman gain medium.

6. The metro wavelength division multiplexing network as claimed in claim 5, wherein the couple includes an arrayed waveguide grating (AWG).

7. The metro wavelength division multiplexing network as claimed in claim 1, wherein the pumping unit includes a laser diode.

8. The metro wavelength division multiplexing network as claimed in claim 1, wherein the center wavelength of optical signals amplified by each Raman gain medium disposed in each of the optical repeater and a center wavelength of optical signals amplified by the gain clamped semiconductor optical amplifier disposed in each of the optical repeater are overlapped with each other, so that it is possible to generate optical signals having high gains in a wide wavelength band.

* * * * *